US011879339B2

(12) United States Patent
Amorim et al.

(10) Patent No.: US 11,879,339 B2
(45) Date of Patent: Jan. 23, 2024

(54) TURBINE ENGINE STATOR CONTROL VALVE COMPRISING A CONTINUOUS AND FREE SEALING RING

(71) Applicant: SAFRAN AIRCRAFT ENGINES, Paris (FR)

(72) Inventors: Joao Antonio Amorim, Moissy-Cramayel (FR); Vahe Kupelian, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/906,553

(22) PCT Filed: Mar. 22, 2021

(86) PCT No.: PCT/FR2021/050473
§ 371 (c)(1),
(2) Date: Sep. 16, 2022

(87) PCT Pub. No.: WO2021/191540
PCT Pub. Date: Sep. 30, 2021

(65) Prior Publication Data

US 2023/0160314 A1 May 25, 2023

(30) Foreign Application Priority Data

Mar. 25, 2020 (FR) ....................................... 2002923

(51) Int. Cl.
*F01D 11/00* (2006.01)
*F01D 9/04* (2006.01)
(Continued)

(52) U.S. Cl.
CPC ............ *F01D 11/001* (2013.01); *F01D 5/147* (2013.01); *F01D 9/02* (2013.01); *F01D 9/041* (2013.01);
(Continued)

(58) Field of Classification Search
CPC ... F01D 5/147; F01D 9/02; F01D 9/04; F01D 9/041; F01D 9/042; F01D 25/243; F01D 25/246; F01D 11/001
See application file for complete search history.

(56) References Cited

U.S. PATENT DOCUMENTS 5,346,362 A * 9/1994 Bonner ................... F01D 25/04
415/209.1
6,042,334 A * 3/2000 Schilling ............... F01D 11/001
415/170.1
(Continued)

FOREIGN PATENT DOCUMENTS

EP 0 980 963 A2 2/2000
EP 3 492 704 A1 6/2019
FR 2 962 157 A1 1/2012

OTHER PUBLICATIONS

International Search Report dated Jun. 11, 2021 in PCT/FR2021/050473 filed on Mar. 22, 2021 (2 pages).
(Continued)

*Primary Examiner* — Brian Christopher Delrue
(74) *Attorney, Agent, or Firm* — Oblon, McClelland, Maier & Neustadt, L.L.P.

(57) ABSTRACT

A control valve composed of sectors of stationary blades, which are externally connected to a stator, includes an inner platform divided into an outer portion formed of sectors and associated, by radial slide connections, with an inner portion in the form of a ring which is continuous over a circumference, which carries an abradable seal. Springs ensure the radial position of the crown, and the concentricity thereof to the rest of the machine. The diameter of the crown is essentially determined by the temperature of the gases which pass in front of it. The independence of the radial thermal deformations is ensured by slides composed of sliding sleeves.

9 Claims, 3 Drawing Sheets

Figure 1:
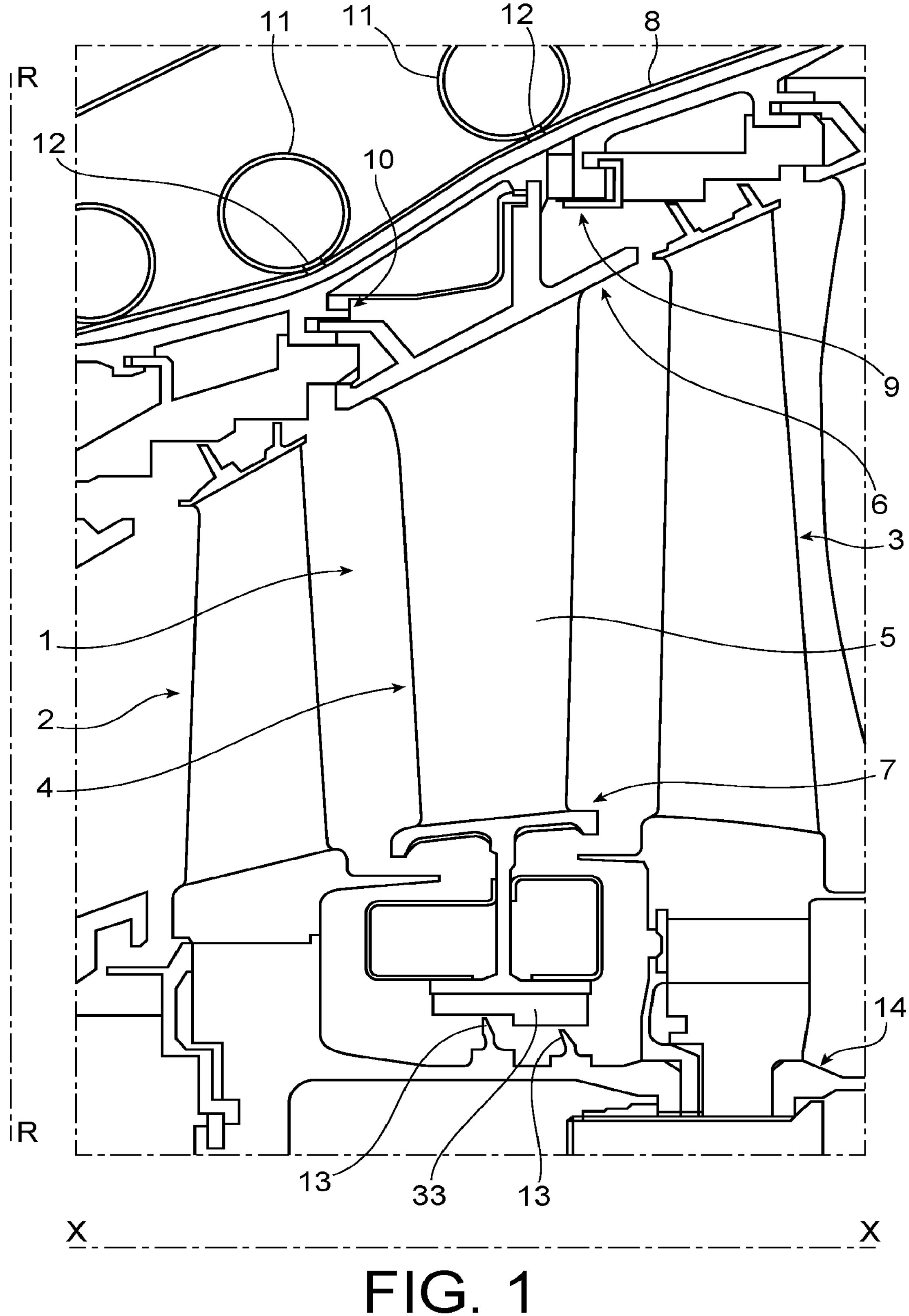

(51) Int. Cl.
*F01D 25/24* (2006.01)
*F01D 9/02* (2006.01)
*F01D 5/14* (2006.01)

(52) U.S. Cl.
CPC ........... *F01D 9/042* (2013.01); *F01D 25/243* (2013.01); *F01D 25/246* (2013.01); *F05D 2240/58* (2013.01)

(56) References Cited

U.S. PATENT DOCUMENTS

| | | | | |
|---|---|---|---|---|
| 6,514,041 | B1 * | 2/2003 | Matheny | F01D 11/18<br>415/177 |
| 7,291,946 | B2 * | 11/2007 | Clouse | F01D 11/08<br>415/119 |
| 9,500,094 | B1 | 11/2016 | Eng et al. | |
| 9,644,640 | B2 * | 5/2017 | Kapala | F04D 29/083 |
| 10,215,044 | B2 * | 2/2019 | Zhang | F16J 15/445 |
| 2004/0145251 | A1 * | 7/2004 | Clouse | F01D 9/042<br>310/51 |
| 2007/0132193 | A1 * | 6/2007 | Wolfe | F16J 15/445<br>277/415 |
| 2011/0135479 | A1 | 6/2011 | Ueda et al. | |
| 2012/0003080 | A1 | 1/2012 | Deo et al. | |
| 2012/0128476 | A1 * | 5/2012 | Bouru | F01D 25/243<br>415/199.4 |
| 2012/0195745 | A1 | 8/2012 | Kapala | |
| 2018/0112555 | A1 * | 4/2018 | Humhauser | F01D 25/06 |
| 2020/0025018 | A1 | 1/2020 | Schlemmer | |

OTHER PUBLICATIONS

Preliminary French Search Report with translation of categories dated Sep. 29, 2020 in French Application 2002923 filed on Mar. 25, 2020 (2 pageas).

* cited by examiner

TURBINE ENGINE STATOR CONTROL VALVE COMPRISING A CONTINUOUS AND FREE SEALING RING

The subject of the invention is a turbine engine stator control valve comprising a continuous and free sealing ring.

The control valves in question herein are crowns of stationary blades, fastened to a casing of the stator and alternating with crowns of movable blades in the compressors and the turbines of the turbine engines. The blades are mounted on the casing of the stator by connections comprising imbrications of hooks, and the radially inner ends thereof are provided with seals, made of materials called abradable materials, cooperating with adjacent wipers (circular ridges), belonging to the rotor, to form labyrinth seals. This well-known design, however, requires a control of the clearances in the labyrinth seals, in order to minimise the leaks or, on the contrary, to prevent the premature wear of the abradable, which is achieved by means of a ventilation of the casing by a variable flow rate of pressurised fresh air originating from the compressors, to adjust its diameter through thermal expansions and therefore the radial position of the blades. The withdrawal of a portion of the air flow to combat the leaks through the seal however also imposes a reduction in the efficiency of the turbine engine, and the adjustment of the ventilation can prove to be difficult. In addition, the ventilation generally induces leaks between the sectors of the control valve, at the circumferential spaces which separate the platforms mounted circumferentially end to end.

The object of the invention is to reduce these drawbacks, and more specifically to reduce the flow rate of the residual leaks through the labyrinth seal, while alleviating or even eliminating the ventilation constraints of the casing around the concerned control valve.

The close prior art is represented, in particular, by US 2011/0135479A1, which describes a stator control valve where a bearing ring of an element of the labyrinth seal is continuous over a complete circumference and mounted at platform sectors which are directly connected to the stationary blades. The assembly is performed by imbrications of tabs extending in the tangential direction and which therefore only allow very small radial displacements of the ring in the sectors which surround it. A wave-shaped spring is disposed in a circular housing, and it bears on radially opposed forces of this housing, belonging respectively to the sectors and to the ring, to bring the latter back to an invariable position while damping the vibrations created by the rotor. The device is not designed to adjust the clearance between the ring and a rotor that it surrounds.

The invention relates, in a general form, to a turbine engine stator control valve comprising crown sectors which are disposed circumferentially end to end about an axis of the turbine engine, each of the sectors comprising at least one stationary blade which extends from a radially inner platform, a sealing ring carrying an abradable sealing element surrounded by the platforms of the sectors, the sealing ring being connected to the platforms by slide connections, characterised in that each slide connection includes a first sleeve secured to a sealing ring and a second sleeve secured to one of the platforms, the first and second sleeves being nested within each other by sliding and delimiting a housing, and each slide connection including a spring contained in the housing and constrained in the radial direction by being mounted, on the one hand, against one of the platforms and, on the other hand, against the sealing ring The construction of the invention is therefore based on the joint presence of a continuous sealing ring, carrying the abradable, and the main portion of the control valve composed of angular sectors. The radial slides which connect them allow relatively significant radial deflections of the ring relative to the platforms by differential thermal expansion, as well as reduced deflections in the other directions (axial, tangential, and tilting) thanks to the low clearance between inner sleeves and the outer sleeves. The concentricity is maintained by the springs. As the transmission of heat between the ring and the platforms is more reduced in the invention than in other constructions, thanks to the fineness of connection ensured only by the slides, the ring is maintained more easily at a temperature close to that of the rotor than in other constructions, and its diameter can be adjusted independently of the radial position of the blade sectors, by the temperature of the gases passing in front of it. The invention improves sealing by the best adjustment of the clearances between the abradable and the wipers that can be hoped for, and also by the simple presence of the continuous ring, which interrupts the division of the control valve into sectors, at the radially inner end thereof.

According to various independent and optional improvements, generally contributing to the lightness and compactness of the construction:

- the housings contain radially oriented rods;
- the springs are helical and threaded around the rods;
- the rods belong to the platforms and comprise a radially inner free end entering a respective cavity of the ring and retained in said cavity;
- the free ends of the rods are threaded and carry nuts alone which are retained in the cavities;
- the number of the slides is equal to the number of the sectors.

Other aspects of the invention are a turbine equipped with the control valve according to the above, and a turbine engine including such a turbine.

Figure 2:
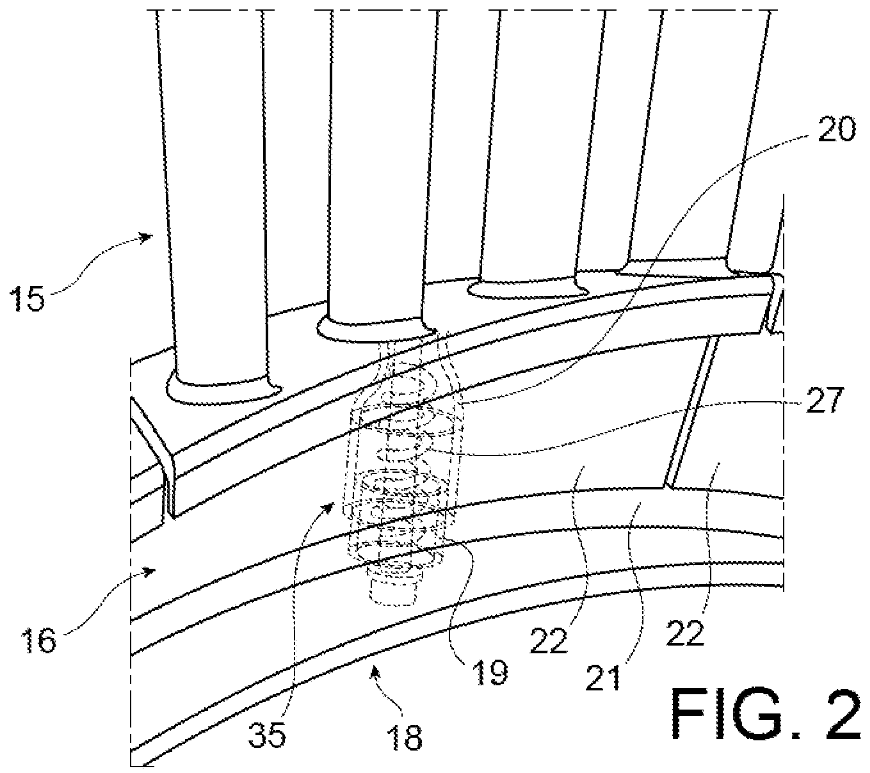
Figure 3:
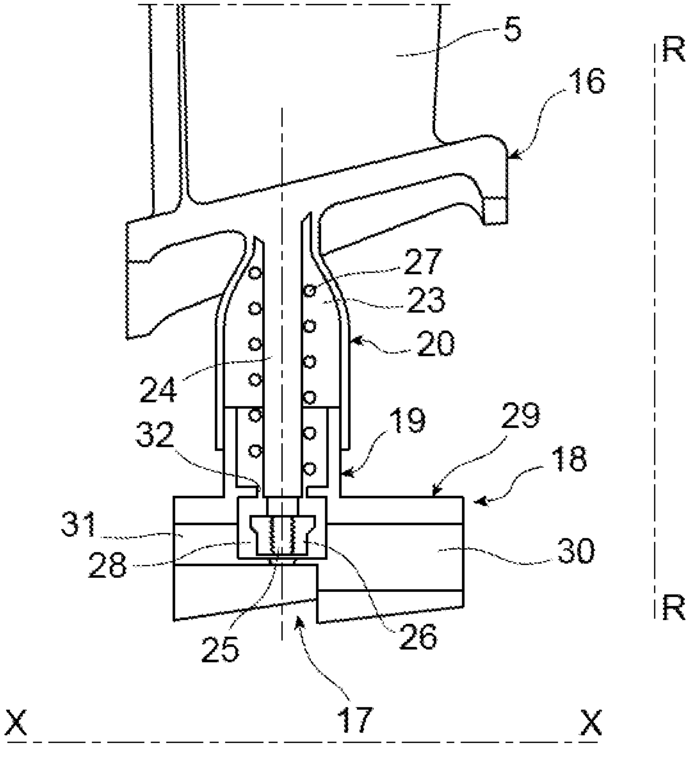
Figure 4:
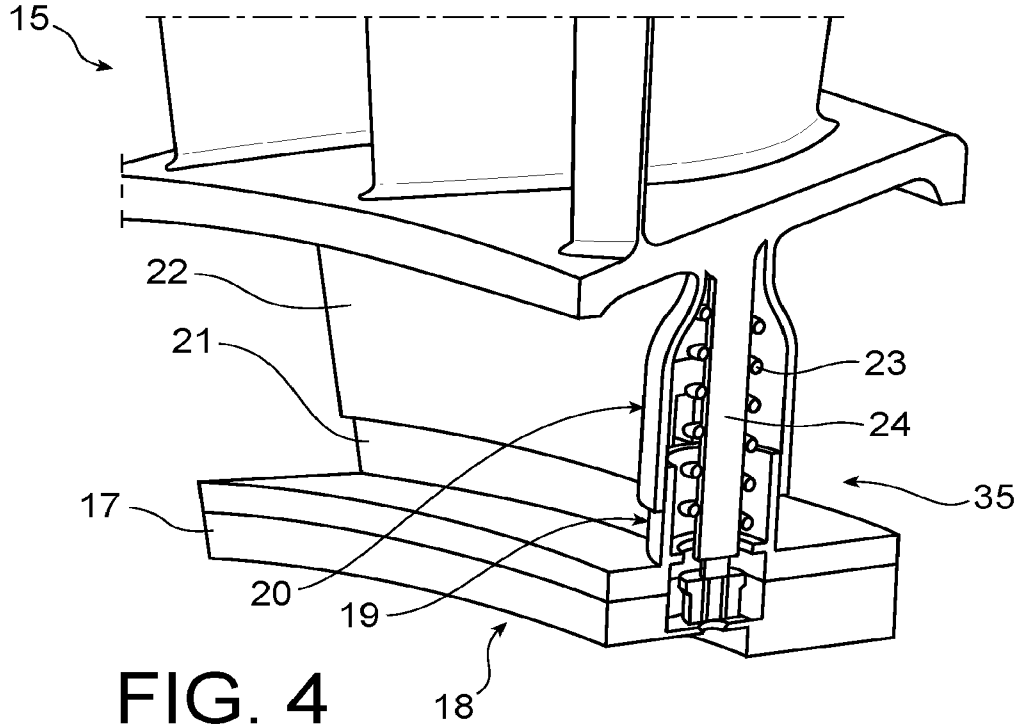
Figure 5:
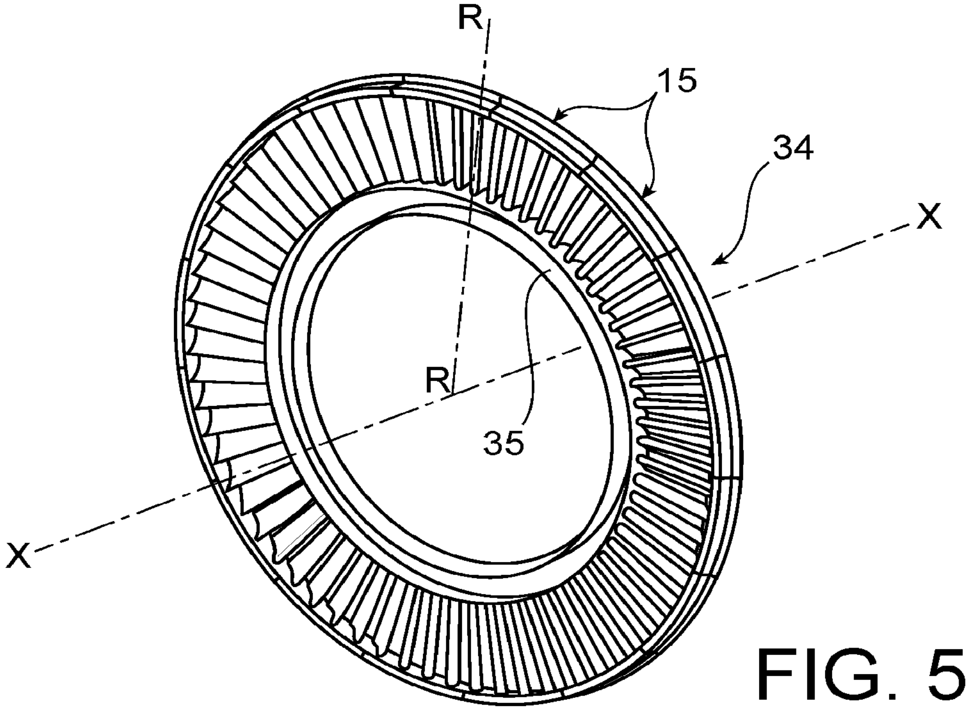

The different aspects, features and advantages of the invention will emerge better from the comment on the following figures, appended for purely illustrative purposes and which completely represent an embodiment thereof:

FIG. 1 general arrangement of a control valve, in a design where it lacks the features of the invention;

FIG. 2 in perspective, an embodiment of the invention;

FIG. 3 the embodiment, in cross section;

FIG. 4 the embodiment, according to another perspective;

FIG. 5 a general view of a control valve.

FIG. 1 represents, in longitudinal section, a portion of a turbine engine in accordance with the known art and comprising a control valve crown 1 between two crowns of movable blades 2 and 3. The control valve 1 comprises crown sectors 4 each comprising a few stationary blades 5 between an outer platform 6 and an outer platform 7 also extending over crown sectors. The outer platform 6 is fastened to a stator casing 8 by an assembly via an upstream hook 9 and a downstream hook 10 (the upstream and the downstream are understood relative to the general direction of the gases flowing in the turbine engine, for this entire description). A ventilation device is disposed outside the stator casing 8; it comprises tubular ramps 11 flowed through by flow rates of fresh gases subtracted from the compressor of the turbine engine, which extend substantially in line with the assembly via the hooks 9 and 10, to blow fresh air therein through orifices 12, to cool the stator casing 8 at the place of the assembly via the hooks 9 and 10 and therefore to adjust the local thermal expansions of the stator casing 6 and thus the radial position of the crown sectors 4 of the control valve 1.

The radially inner platform 7 comprises an abradable seal 33 at the radially inner end thereof, which is directed radially inwards and forms a labyrinth seal with wipers 13 which are radially disposed facing each other, depending on a rotor 14 to which the crowns of movable blades, such as 2 and 3, belong. Throughout this description, the axial X-X and radial R-R directions are considered with reference to the axis about which the turbine engine extends, the axial direction also corresponding to the axis of rotation of the rotor 14.

FIGS. 2 to 4 are now contemplated. The sectors of control valve crowns 15 in accordance with the invention differ from those of known embodiments in that they comprise a radially inner platform 16 devoid of the abradable seal required to establish the sealing with the rotor 14, an abradable layer which replaces it, now 17, belonging to a ring 18, which is continuous over a circumference, therefore common to the control valve crown sectors 15. The ring 18 comprises annular inner sleeves 19 standing on the radially outer face thereof in the radial direction, and whose (radially outer) free end is open. The inner sleeves 19 slide in outer sleeves 20 standing on the radially inner face of platforms 16 in the radial direction and whose (radially inner) free end is also open. In addition to the inner sleeves 19, the radially outer face of the ring 18 carries a planar outer rib 21 which extends along inner ribs 22, which are also planar, of the control valve sectors 15. The inner ribs 22 herein are joined to the outer sleeves 20, without it being necessary. The inner sleeves 19 could be placed on the platforms 16, and the outer sleeves 20 on the ring 18. They are represented integral on the ring 18 and the platforms 16, that is to say manufactured in same time as the ring and the platforms, by foundry for example, but it is possible to manufacture them separately and then fasten them by welding or otherwise.

The inner sleeves 19 and the outer sleeves 20 define cylindrical housings 23 in which radially oriented rods 24 extend, carried by the inner platforms 16 and comprising a threaded (radially inner) free end 25 on which a nut 26 is screwed. A helical spring 27 is threaded around the rod 24. The inner sleeves 19, outer sleeves 20 and springs 27 form slide connections 35 between the control valve sectors 15 and the ring 18 which allow the latter to be displaced in the radial direction, by contracting or expanding. The nut 26 of each rod 24 is disposed with a clearance in a cavity 28 delimited by several portions, which are assembled to each other, of the ring 18, for example a cylindrical bandage 29 which constitutes the main structure thereof, and two frames 30 and 31 of portions of the abradable 17 which follow each other in the axial direction of the turbine engine. The cavity 28 is provided with a bore 32 to allow the threaded free end 25 and the rod 24 to extend outwardly and to slide with a sufficient clearance.

The spring 27 of each rod 24 is compressed between the inner platform 16 and the cylindrical bandage 29 of the ring 18. This assembly allows the ring 18 to acquire a radial position determined exclusively by the thermal expansions that it undergoes, mainly due to the gas stream which circulates around it and crosses it by passing in front of the abradable 17. There is in fact no connection between the rods 24 and the nuts 26, housed with clearance in the cavities 28, and the ring 18. The axial position and the angular position of the ring 18 are ensured with sufficient accuracy by the sliding of the inner sleeves 19 in the outer sleeves 20. The radial position of the ring 18 therefore becomes more or less independent from that of the control valve crown sectors 15 and is no longer governed by the ventilation devices, whose importance becomes less and whose elimination can even be considered. This radial position of the ring 18 can be evaluated with a sufficient accuracy to avoid the excessive clearances either in the labyrinth seal or on the contrary the premature wear of the abradable 17, thanks to the knowledge of the predictable temperature of the gases circulating in the turbine engine. In particular, the outer rib 21 partially eliminates the leaks originating from the clearances at the inner platforms 16 of the crown sectors of the control valves 15 by covering a portion of the interstices therebetween at the location of the inner ribs 22.

The connection of the ring 18 to the platforms 16 by the relatively few and low-bulk slides 35 contributes to the lightness of the construction, as well as the clogging of their interval only by the parallel ribs 21 and 22, which do not have a structural role and may be fine.

FIG. 5 illustrates the complete control valve 34. The slide connection 35 is present herein on each of the control valve crown sectors 15, without it being necessary to properly support the ring. Three slides 35 could be sufficient; a number of three to twenty would be preferable to promote guiding the free expansion in operation.

The nuts 26 are used essentially to support the ring 18 during the assembly of the device. It is provided that the cavities 28 are wide enough to avoid stops of the nuts 26 regardless of the predictable thermal expansions of the ring 18.

The invention claimed is:

1. A turbine engine stator control valve comprising crown sectors which are disposed circumferentially end to end about an axis of the turbine engine, each of the sectors comprising at least one stationary blade which extends from a radially inner platform, a sealing ring carrying an abradable sealing element surrounded by the platforms of the sectors, the sealing ring being connected to the platforms by slide connections, wherein each slide connection includes a first sleeve secured to a sealing ring and a second sleeve secured to one of the platforms, the first and second sleeves being nested within each other by sliding and delimiting a housing, and each slide connection including a spring contained in the housing and constrained in the radial direction by being mounted, on the one hand, against one of the platforms and, on the other hand, against the sealing ring.

2. The stator control valve according to claim 1, wherein the crown sectors and the sealing ring comprise portions, which are configured to slide in front of each other in a radial direction of the control valve and by overlapping axially on either side of the slide connection, which are ribs of mainly radial orientation.

3. The stator control valve according to claim 1, wherein the housings contain rods of radial orientation.

4. The turbine engine stator control valve according to claim 3, wherein the springs are helical and threaded around the rods.

5. The turbine engine stator control valve according to claim 3, wherein each rod is associated with a respective one of the platforms and comprises a radially inner free end, entering a respective cavity of the sealing ring with clearance in said respective cavity.

6. The turbine engine control valve according to claim 5, wherein the free end of each of the rods is threaded and carries a nut which is retained in a respective cavity.

7. The turbine engine stator control valve according to claim 1, wherein the number of the slides is equal to the number of the sectors.

8. A turbine engine turbine, wherein said turbine comprises a control valve according to claim 1.

9. A turbine engine, wherein said engine comprises a turbine according to claim 8.

* * * * *